United States Patent
Morihara

(10) Patent No.: US 11,376,938 B2
(45) Date of Patent: Jul. 5, 2022

(54) CORNER PART STRUCTURE OF GLASS RUN

(71) Applicant: NISHIKAWA RUBBER CO., LTD., Hiroshima (JP)

(72) Inventor: Yasuhiro Morihara, Hiroshima (JP)

(73) Assignee: NISHIKAWA RUBBER CO., LTD., Hiroshima (JP)

(*) Notice: Subject to any disclaimer, the term of this patent is extended or adjusted under 35 U.S.C. 154(b) by 0 days.

(21) Appl. No.: 17/157,645

(22) Filed: Jan. 25, 2021

(65) Prior Publication Data

US 2021/0229539 A1 Jul. 29, 2021

(30) Foreign Application Priority Data

Jan. 29, 2020 (JP) .............................. JP2020-013065
Jan. 29, 2020 (JP) .............................. JP2020-013066

(51) Int. Cl.
| | |
|---|---|
| *E06B 7/16* | (2006.01) |
| *B60J 10/21* | (2016.01) |
| *B60J 10/76* | (2016.01) |
| *B60J 5/04* | (2006.01) |
| *B60J 10/88* | (2016.01) |

(52) U.S. Cl.
CPC .............. *B60J 10/21* (2016.02); *B60J 10/76* (2016.02); *B60J 5/0402* (2013.01); *B60J 10/88* (2016.02)

(58) Field of Classification Search
CPC ... B60J 10/21; B60J 10/76; B60J 10/88; B60J 10/79; B60J 5/0402; B60J 1/17; B60R 13/04

USPC ..................................................... 49/479.1
See application file for complete search history.

(56) References Cited

U.S. PATENT DOCUMENTS

| | | | | |
|---|---|---|---|---|
| 8,051,606 | B2 * | 11/2011 | Maab .................. | B60J 10/74 |
| | | | | 49/479.1 |
| 8,434,267 | B2 * | 5/2013 | Bocutto .............. | B60J 10/70 |
| | | | | 49/495.1 |
| 8,479,449 | B2 * | 7/2013 | Titz .................... | B60J 10/78 |
| | | | | 49/440 |
| 8,646,213 | B2 * | 2/2014 | Suzuki ................ | B60J 10/78 |
| | | | | 49/479.1 |

(Continued)

FOREIGN PATENT DOCUMENTS

| | | |
|---|---|---|
| EP | 2688759 B1 | 10/2014 |
| FR | 3049510 A1 | 10/2017 |

(Continued)

*Primary Examiner* — Jerry E Redman
(74) *Attorney, Agent, or Firm* — Holtz, Holtz & Volek PC

(57) ABSTRACT

A die molded part of a glass run connects an upper part of a second extrusion molded part closer to a pillar with an end of a first extrusion molded part closer to a roof. An insert panel is embedded in the die molded part with a concave shaped part of the insert panel exposed toward an exterior of an automobile. An outer garnish couples to the die molded part from the exterior of the automobile by fitting a convex shaped part of the outer garnish into the concave shaped part of the insert panel with a second anchoring part on the convex shaped part engaging with a first anchoring part on the concave shaped part. The concave shaped part includes a through hole which penetrates the insert panel in an inner-cabin and outer-cabin direction. A lid closes an inner-cabin side of the through hole.

5 Claims, 13 Drawing Sheets

(56) References Cited

U.S. PATENT DOCUMENTS

| | | | | |
|---|---|---|---|---|
| 8,667,738 B2* | 3/2014 | Kondo | ..................... | B60J 10/36 |
| | | | | 49/492.1 |
| 11,117,456 B2* | 9/2021 | Krefta | ..................... | B60J 10/21 |
| 2002/0062596 A1 | 5/2002 | Palicki | | |
| 2002/0139054 A1* | 10/2002 | Schlachter | ............... | B60J 10/88 |
| | | | | 49/479.1 |
| 2005/0120634 A1 | 6/2005 | Drivon et al. | | |
| 2008/0265615 A1* | 10/2008 | Eguchi | ....................... | B60J 1/08 |
| | | | | 296/146.2 |
| 2009/0021044 A1* | 1/2009 | Maab | ....................... | B60J 10/21 |
| | | | | 49/506 |
| 2009/0108625 A1* | 4/2009 | Minami | ................. | B60J 10/265 |
| | | | | 49/490.1 |
| 2010/0126077 A1* | 5/2010 | Eguchi | ....................... | B60J 1/08 |
| | | | | 49/479.1 |
| 2014/0007511 A1 | 1/2014 | Franzen | | |
| 2016/0176275 A1* | 6/2016 | Ranzau | ................... | B60J 10/21 |
| | | | | 49/479.1 |
| 2019/0031004 A1* | 1/2019 | Kanphade | ................ | B60J 10/21 |
| 2020/0189371 A1 | 6/2020 | Petit et al. | | |
| 2021/0229539 A1* | 7/2021 | Morihara | ................. | B60J 10/21 |
| 2021/0300166 A1* | 9/2021 | Kajita | ..................... | B60J 10/25 |

FOREIGN PATENT DOCUMENTS

| | | |
|---|---|---|
| GB | 2438406 B | 3/2011 |
| JP | H0733724 U | 6/1995 |
| JP | 2005247294 A | 9/2005 |
| WO | 2019043228 A1 | 3/2019 |

* cited by examiner exterior of automobile ←    → interior of automobile

CORNER PART STRUCTURE OF GLASS RUN

CROSS REFERENCE TO RELATED APPLICATION

This application claims the benefit under 35 USC § 119 of JP Patent Applications JP 2020-013065 filed Jan. 29, 2020 and JP 2020-013066 filed Jan. 29, 2020, the entire disclosure of which is incorporated herein by reference.

BACKGROUND INFORMATION

The present invention relates to a corner part structure of a glass run. The glass run couples to a frame of an automobile door for guiding a door glass in a frame.

As illustrated in FIG. 11, an ordinary glass run 20 couples to parts of a front door 200 and a rear door 300 of an automobile closer to a roof and a pillar for guiding a door glass 9 in the frame.

The glass run 20 illustrated in FIG. 12 couples to the rear door 300. The glass run 20 is so-called "hidden type", and covers up a part of a first part 400 of the frame closer to the roof of the automobile body from an exterior of an automobile. On a corner part of the rear door 300 closer to a front part of the automobile body, a die molded part 15 connects an upper part of a second extrusion molded part 12 closer to the pillar of the automobile body and an upper part of a parting seal 13 with an end of a first extrusion molded part 11 closer to the roof of the automobile body by die molding. The first extrusion molded part 11 extends levelly along the first part 400 and is formed by extrusion molding. The second extrusion molded part 12 extends in an upper and lower direction of the automobile body along a second part 500 of the frame closer to the pillar of the automobile body and is formed by extrusion molding. The parting seal 13 extends in the upper and lower direction of the automobile body to close a parting portion S and is formed by extrusion molding.

The parting portion S is between the rear door 300 and a front door 200. In FIG. 12, black parts of two pairs of black and white triangles define the die molded part 15 and white parts define the extrusion molded parts. A shaded part indicates the die molded part 15.

As illustrated in FIG. 13, an outer garnish 18 couples to a space between the second extrusion molded part 12 and the parting seal 13 from the exterior of the automobile.

As illustrated in FIG. 14, the glass run 20 includes a body 21, an installation member 25, an outer lip 26, and an inner lip 27. The body 21 includes an outer-cabin side wall 22, an inner-cabin side wall 23, and a glass run side wall 24. The glass run side wall 24 connects the side walls 22, 23 and forms a channel M. The installation member 25 is formed on an outer side (upper side) of the body 21, and is assembled on a first flange 401. The first flange 401 extends toward the exterior of the automobile from the first part 400. The outer lip 26 extends toward an interior of the automobile from an end 22a of the outer-cabin side wall 22 and is slidably brought into contact with a door glass 9. The inner lip 27 extends toward the exterior of the automobile from an end 23a of the inner-cabin side wall 23 and is slidably brought into contact with the door glass 9.

Two (or one) body seal lips 31 extend from an outer side (upper side) of a body side wall 28 and make elastic contact with a circumferential edge of a door opening of the automobile body. The body side wall 28 forms a part of the installation member 25. In addition, a decorative member 30 is provided on an outer-cabin side of a connecting wall 29 of the installation member 25. The connecting wall 29 connects an outer-cabin side of the body side wall 28 and an outer-cabin side of the glass run side wall 24. The installation member 25 has a core 32 buried therein. The core 32 has a substantially U-shaped cross-section (see, for example, WO 2019/043228).

FIG. 15 and FIG. 16 illustrate a method of coupling the outer garnish 18 to the "hidden type" glass run 20. The method includes: forming a cutout (notch) on the first part 400; fixing a holder 41 on the cutout by a pin 43; and fitting a convex shaped part 19 of the outer garnish 18 into a concave shaped part 42 of the holder 41. The concave shaped part 42 extends toward the exterior of the automobile from the holder 41. The convex shaped part 19 extends toward the interior of the automobile from the outer garnish 18 (see, for example, WO 2019/043228).

In general, a part of the automobile body or a part of an automobile door closer to an upper part of the automobile body than a belt line gradually approaches a center of the automobile body in a front and rear direction ((so-called "camber"), see, for example, FIG. 4 of Japanese unexamined Patent Publication No. 2005-247294). Also, some parking spaces include inclined road surfaces (see, for example, FIG. 2 of Japanese Unexamined Utility Model Application Publication No. 07-033724).

Unfortunately, however, the method illustrated in FIG. 15 and FIG. 16 necessitates an extra process of forming the cutout (notch) on first flange 401 of the first part 400 for the holder 41 to couple to the first part 400 directly. Also, water may infiltrate the interior of the automobile from the cutout.

In addition, the outer garnish 18 couples to the "hidden type" glass run 20 merely by coupling the convex shaped part 19 of the outer garnish 18 to the concave shaped part 42 of the holder 41. In other words, the convex shaped part 19 slightly engages with the concave shaped part 42, and is unstable on the concave shaped part 42.

In addition, with the configuration illustrated in FIG. 15 and FIG. 16, an inner part of the concave shaped part 42 of the holder 41 relative to an opening of the concave shaped part 42 may be closer to a lower part of the automobile body due to the camber of the automobile or the slope on the road surfaces of the parking spaces. As a result, water for car washing or rain water may collect in the inner part of the concave shaped part 42.

Water which collects in the inner part of the concave shaped part 42 may splash passengers while the automobile door is being opened, or may infiltrate the interior of the automobile.

A principal object of the present invention is to provide the corner part structure which simplifies coupling operation of the outer garnish to the glass run and is excellent in sealing performance.

It is another object of the present invention to provide the corner part structure which prevents water from collecting in the concave shaped part of the holder even in case water infiltrates the concave shaped part. The concave shaped part of the holder engages with the convex shaped part of the outer garnish.

SUMMARY

In order to achieve the above-mentioned object, according to one aspect of the invention, a corner part structure of a glass run (20) for at least one of a rear door (300) and a front door (200) of an automobile is provided, for guiding a door glass (9) in a frame. The frame includes a first part (400) of the frame closer to a roof of an automobile body and a second part (500) of the frame closer to a pillar of the automobile body. The corner part structure includes a body (21), a first extrusion molded part (11) closer to the roof of the automobile body, a second extrusion molded part (12) closer to the pillar of the automobile body, a die molded part (15), an insert panel (50), an outer garnish (60), a first anchoring part (55), a second anchoring part (64, 65), and a lid (70).

The body (21) includes an outer-cabin side wall (22), an inner-cabin side wall (23), and a glass run side wall (24). The glass run side wall (24) connects the outer-cabin side wall (22) and the inner-cabin side wall (23) and forms a channel (M). The channel (M) receives the door glass (9).

The first extrusion molded part (11) extends levelly along the first part (400) and is formed by extrusion molding.

The second extrusion molded part (12) extends in an upper and lower direction of the automobile body along the second part (500) and is formed by extrusion molding.

The die molded part (15) connects an upper part of the second extrusion molded part (12) with an end of the first extrusion molded part (11).

The insert panel (50) is embedded in the die molded part (15) with a concave shaped part (51) of the insert panel (50) exposed toward an exterior of the automobile. The concave shaped part (51) includes a through hole. The through hole penetrates the insert panel (50) in an inner-cabin and outer-cabin direction.

The outer garnish (60) couples to the die molded part (15) from the exterior of the automobile by fitting a convex shaped part (61) of the outer garnish (60) into the concave shaped part (51) of the insert panel (50).

The first anchoring part (55) is formed on the concave shaped part (51) of the insert panel (50).

The second anchoring part (64, 65) is formed on the convex shaped part (61) of the outer garnish (60). The second anchoring part (64, 65) engages with the first anchoring part (55).

The lid (70) closes an inner-cabin side of the through hole.

In addition, according to an aspect of the present invention, the lid (70) is separate from the insert panel (50) and the lid (70) is fit on an inner-cabin side of the insert panel (50).

In addition, according to an aspect of the present invention, the lid (70) is integral with the insert panel (50) by a hinge, the lid (70) rotates to approach the insert panel (50) with the hinge as starting point, and the lid (70) couples to an inner-cabin side of the insert panel (50).

In addition, according to an aspect of the present invention, a corner part structure of a glass run (20) for at least one of a rear door (300) and a front door (200) of an automobile is provided, for guiding a door glass (9) in a frame. The frame includes a first part (400) closer to a roof of an automobile body and a second part (500) closer to a pillar of the automobile body. The corner part structure includes a body (21), a first extrusion molded part (11) closer to the roof of the automobile body, a second extrusion molded part (12) closer to the pillar of the automobile body, a die molded part (15), an insert panel (50), an outer garnish (60), a first anchoring part (55), a second anchoring part (64, 65), and a drainage channel (81).

The body (21) includes an outer-cabin side wall (22), an inner-cabin side wall (23), and a glass run side wall (24). The glass run side wall (24) connects the outer-cabin side wall (22) and the inner-cabin side wall (23) and forms a channel (M).

The first extrusion molded part (11) extends levelly along the first part (400) and is formed by extrusion molding.

The second extrusion molded part (12) extends in an upper and lower direction of the automobile body along the second part (500) and is formed by extrusion molding.

The die molded part (15) connects an upper part of the second extrusion molded part (12) with an end of the first extrusion molded part (11).

The insert panel (50) is embedded in the die molded part (15) with a concave shaped part (51) of the insert panel (50) exposed toward an exterior of the automobile.

The outer garnish (60) couples to the die molded part (15) from the exterior of the automobile by fitting a convex shaped part (61) of the outer garnish (60) into the concave shaped part (51) of the insert panel (50).

The first anchoring part (55) is formed on the concave shaped part (51) of the insert panel (50).

The second anchoring part (64, 65) is formed on the convex shaped part (61) of the outer garnish (60). The second anchoring part (64, 65) engages with the first anchoring part (55).

The drainage channel (81) is formed on an outer-cabin side surface of a first end of the concave shaped part (51) of the insert panel (50). The first end of the concave shaped part (51) is closer to a parting portion (S) than a second end opposite the first end. The parting portion (S) is between the rear door (300) and the front door (200). The drainage channel (81) gradually inclines downward toward the exterior of the automobile from an interior of the automobile.

In addition, according to an aspect of the present invention, the corner part structure further includes a drainage bead (82). The drainage bead (82) is formed on the die molded part (15) below the drainage channel (81). The drainage bead (82) makes elastic contact with an inner-cabin side surface of the outer garnish (60). The drainage bead (82) gradually inclines downward toward the parting portion (S) from the second part (500).

Symbols in parentheses show constituents or items corresponding to the drawings.

According to the present invention, the die molded part connects the upper part of the second extrusion molded part closer to the pillar of the automobile body with the end of the first extrusion molded part closer to the roof of the automobile body, and the outer garnish couples to the die molded part from the exterior of the automobile. The insert panel is embedded in the die molded part with the concave shaped part of the insert panel exposed toward the exterior of the automobile. The first anchoring part is formed on the concave shaped part of the insert panel. The second anchoring part is formed on the convex shaped part of the outer garnish. The outer garnish couples to the die molded part from the exterior of the automobile with the second anchoring part engaging with the first anchoring part. This configuration eliminates the need for forming a cutout (notch) on the frame.

Accordingly, water does not infiltrate an interior of the automobile from the cutout.

Since the first anchoring part and the second anchoring part are tightly engaged with each other, the outer garnish couples to the die molded part more stably than an ordinary outer garnish which slightly engages with the concave shaped part.

In addition, the concave shaped part of the insert panel includes the through hole which penetrates the insert panel in the inner-cabin and outer-cabin direction. With this configuration, a core for die molding is simply pulled out in the process of die molding.

The through hole may cause infiltration of water toward the interior of the automobile from the exterior. But the lid closes the inner-cabin side of the through hole and prevents infiltration of water toward the interior of the automobile.

The lid may be separate from the insert panel or integral with the insert panel by the hinge. But the lid which is integral with the insert panel is simpler in terms of parts management.

In addition, the drainage channel is formed on the outer-cabin side surface of the first end of the concave shaped part of the insert panel. The first end is closer to the parting portion than the second end opposite the first end. The drainage channel gradually inclines downward toward the exterior of the automobile from the interior of the automobile. With this configuration, the drainage channel drains water for car washing or rain water which infiltrates a concave shaped part of a holder of the insert due to camber of the automobile or a slope on a road surface of a parking space. As a result, water does not remain stagnant in the concave shaped part.

In addition, the drainage bead is formed on the die molded part below the drainage channel, the drainage bead makes elastic contact with the inner-cabin side surface of the outer garnish, and the drainage bead gradually inclines downward toward the parting portion from the second part of the frame closer to the pillar of the automobile body. With this configuration, the drainage bead guides water drained by the drainage channel toward the parting portion, and water does not infiltrate the interior of the automobile.

DETAILED DESCRIPTION

Referring to Drawings, a corner part structure according to an embodiment of the present invention of a glass run will be described. When constituents or items correspond to those in prior arts, the same symbols are used.

The corner part structure according to the embodiment of the present invention of the glass run relates to a glass run 20. The glass run 20 couples to an outer-cabin side of a first part 400 of a frame closer to a roof of an automobile body of a front door 200 and a rear door 300 of an automobile illustrated in FIG. 11. The glass run 20 is of so-called "hidden type" and covers up a part of the first part 400 from an exterior of the automobile.

Figure 1:
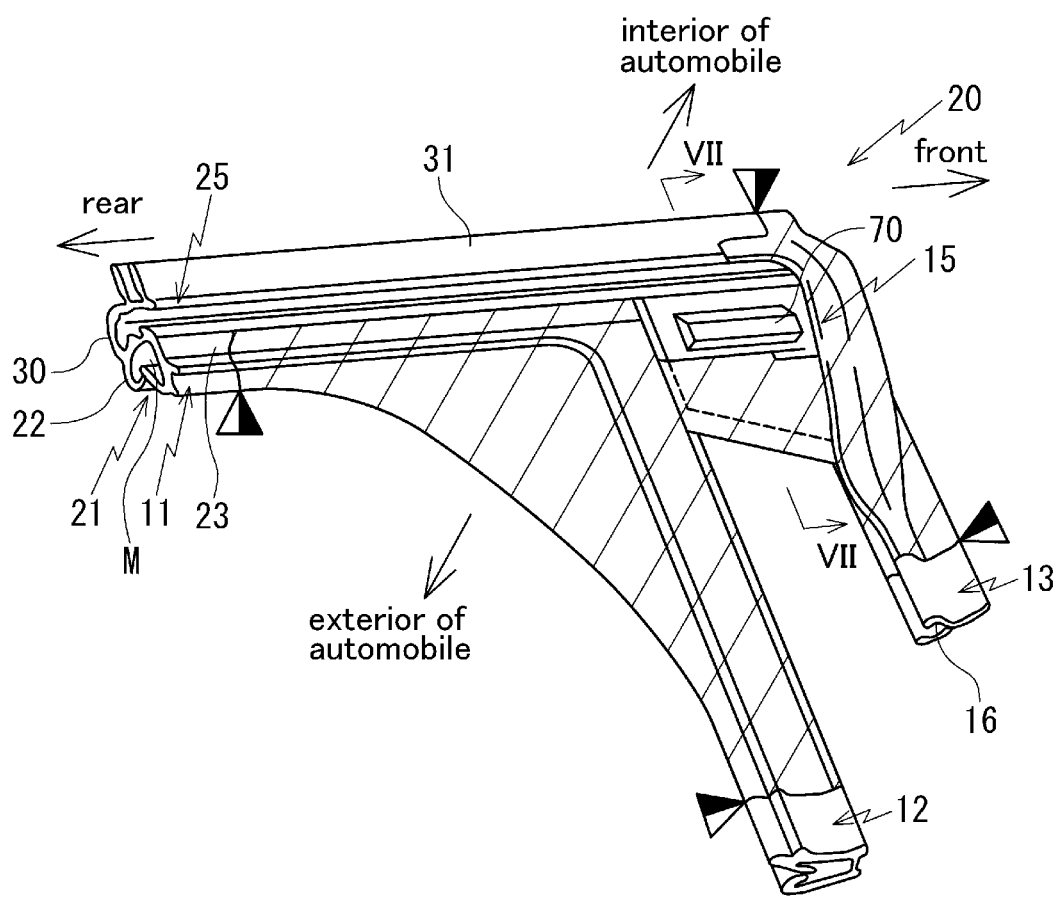
FIG. 1 is a perspective view of an inner-cabin side of a corner part structure according to an embodiment of the present invention of a glass run.
Figure 2:
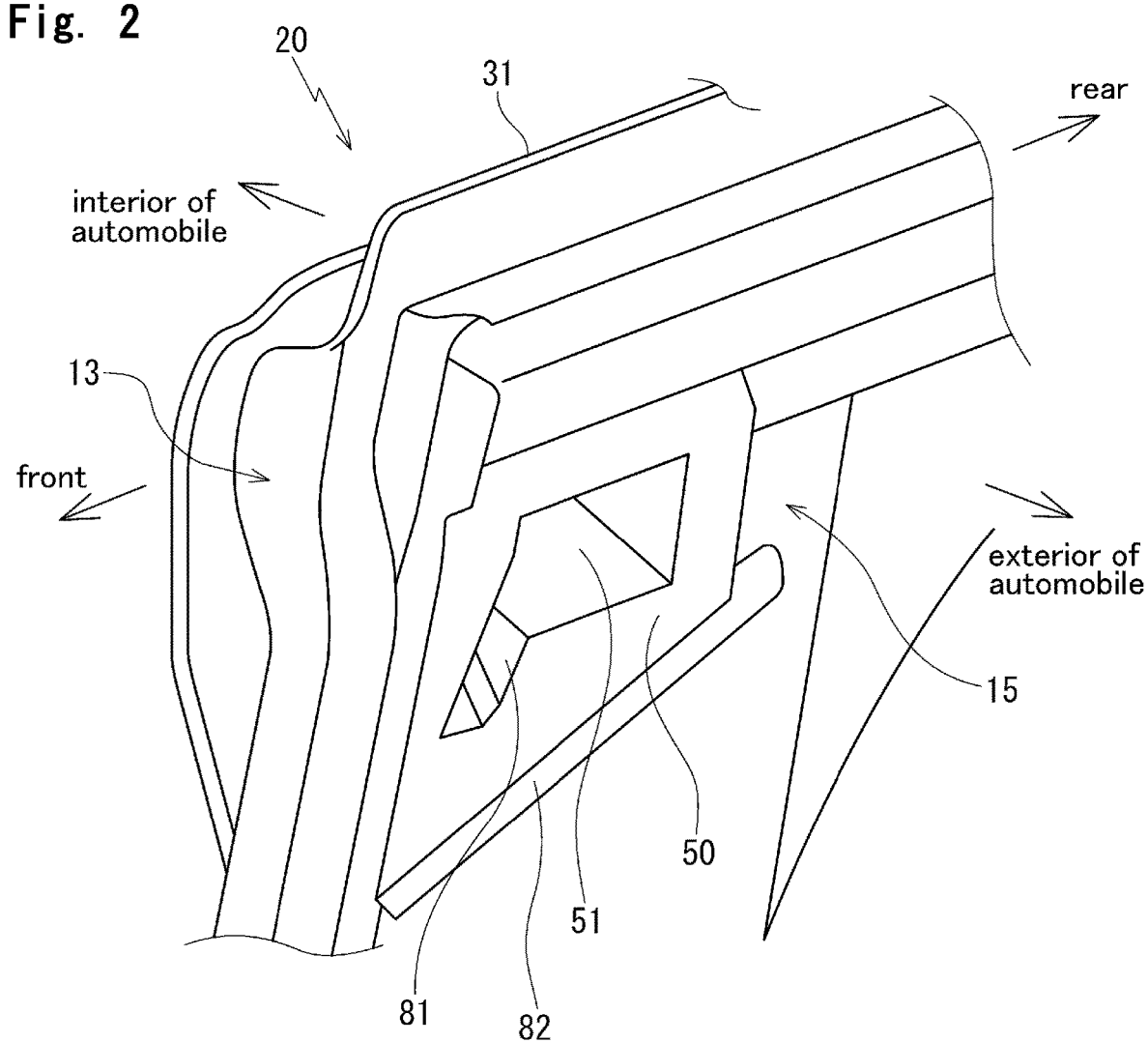
FIG. 2 is a perspective view of an outer-cabin side of the corner part structure according to the embodiment of the present invention of the glass run.

The glass run 20 illustrated in FIGS. 1 and 2 couples to a corner part on an upper part of the rear door 300 closer to a front part of the automobile body. On the corner part, a die molded part 15 connects an upper part of a second extrusion molded part 12 closer to a pillar of the automobile body and an upper part of a parting seal 13 with an end of a first extrusion molded part 11 closer to the roof of the automobile body by die molding. The first extrusion molded part 11 levelly extends and is formed by extrusion molding. The second extrusion molded part 12 extends in an upper and lower direction of the automobile body along a second part 500 of the frame closer to the pillar of the automobile body and is formed by extrusion molding. The parting seal 13 extends in the upper and lower direction of the automobile body to close a parting portion S and is formed by extrusion molding. The parting portion S is between the rear door 300 and the front door 200. FIG. 1 illustrates the corner part of the glass run 20 as viewed from an interior of the automobile. FIG. 2 illustrates the corner part of the glass run 20 as viewed from an exterior of the automobile. In FIG. 1, black parts of two pairs of black and white triangles define the die molded part 15 and white parts define the extrusion molded parts. A shaded part indicates the die molded part 15.

Figure 13:
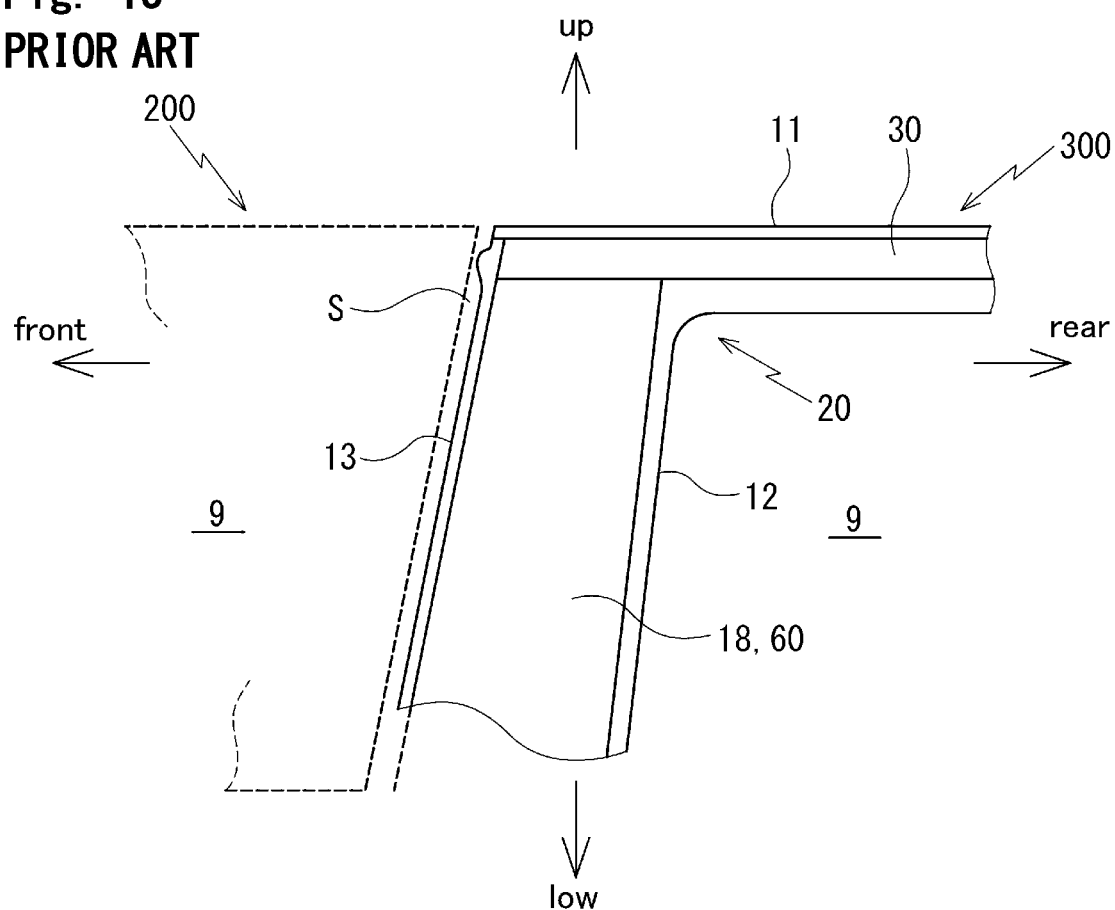
FIG. 13 is an enlarged side view of an important part of FIG. 11.

As illustrated in FIG. 13, an outer garnish 60 couples to a space between the second extrusion molded part 12 and the parting seal 13 from the exterior of the automobile.

Figure 6:
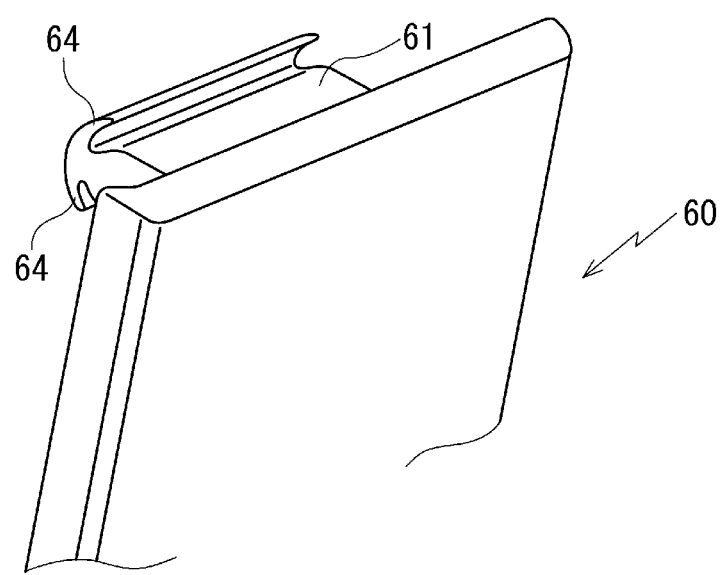
FIG. 6 is an enlarged perspective view of an important part of an outer garnish which couples to the corner part structure according to the embodiment of the present invention of the glass run.

As illustrated in FIG. 6, a convex shaped part 61 is formed on an upper part of the outer garnish 60. The convex shaped part 61 extends inwardly toward the interior of the automobile and has a shape of a block which protrudes. Arrowhead-shaped parts 64, 64 as second anchoring parts are formed on an upper part and a lower part of an inner-cabin side end of the convex shaped part 61.

Figure 14:
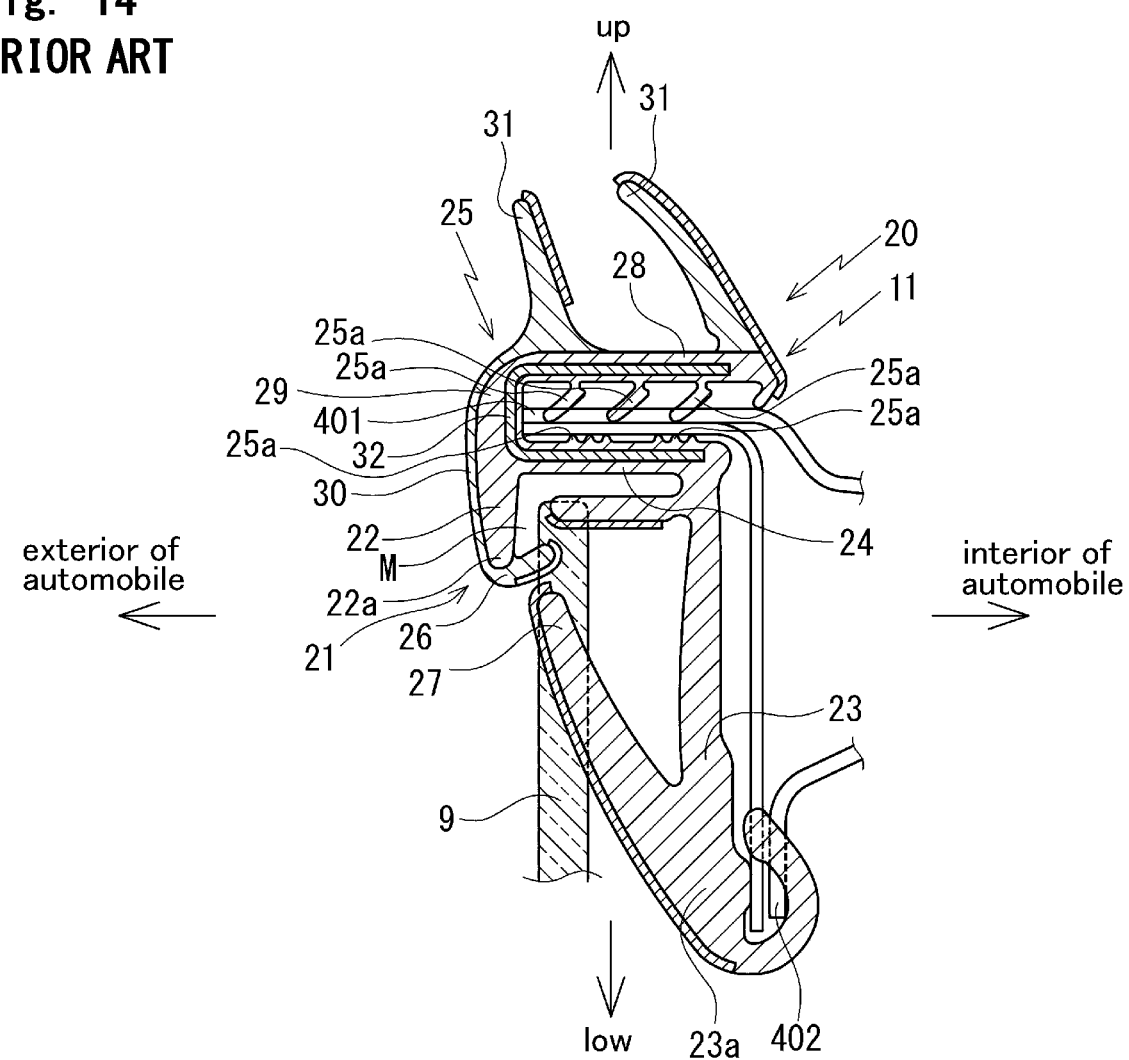
FIG. 14 is an enlarged longitudinal-sectional view of the corner part structure taken along line XIV-XIV of FIG. 12.

In the same manner as an ordinary glass run 20 illustrated in FIG. 14, the first extrusion molded part 11 of the glass run 20 according to the embodiment of the present invention includes a body 21, an installation member 25, an outer lip 26, and an inner lip 27. The body 21 includes an outer-cabin side wall 22, an inner-cabin side wall 23, and a glass run side wall 24. The glass run side wall 24 connects the side walls 22, 23 and forms a channel M. The channel M receives the door glass 9. The installation member 25 is formed on an outer side (upper side) of the body 21, is assembled on a first flange 401, and has a substantially U-shaped cross section. The first flange 401 extends toward the exterior of the automobile from the first part 400. The outer lip 26 extends toward an interior of the automobile from an end 22a of the outer-cabin side wall 22 and is slidably brought into contact with a door glass 9. The inner lip 27 extends toward the exterior of the automobile from an end 23a of the inner-cabin side wall 23 and is slidably brought into contact with the door glass 9.

Two (or one) body seal lips 31 extend from an outer side (upper side) of a body side wall 28 and make elastic contact with a circumferential edge of a door opening of the automobile body. The body side wall 28 forms a part of the installation member 25. A plurality of holding lips 25a are formed on an inner side of the installation member 25. The holding lips 25a clasp and hold the first flange 401 of the first part 400. The first flange 401 is inserted into the inner side of the installation member 25.

In addition, a decorative member 30 is provided on an outer-cabin side of a connecting wall 29. The connecting wall 29 connects an outer-cabin side of the body side wall 28 and an outer-cabin side of the glass run side wall 24. The installation member 25 has a core 32 buried therein. The core 32 has a substantially U-shaped cross-section.

Figure 4A:
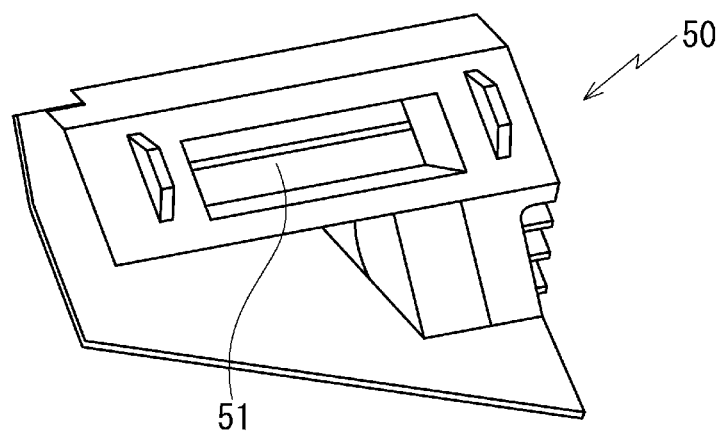
FIG. 4(*a*), FIG. 4(*b*) are enlarged perspective views of an insert panel which couples to the corner part structure according to the embodiment of the present invention of the glass run, FIG. 4(*a*) illustrates an inner-cabin side of the insert panel, FIG. 4(*b*) illustrates an outer-cabin side of the insert panel.
Figure 4B:
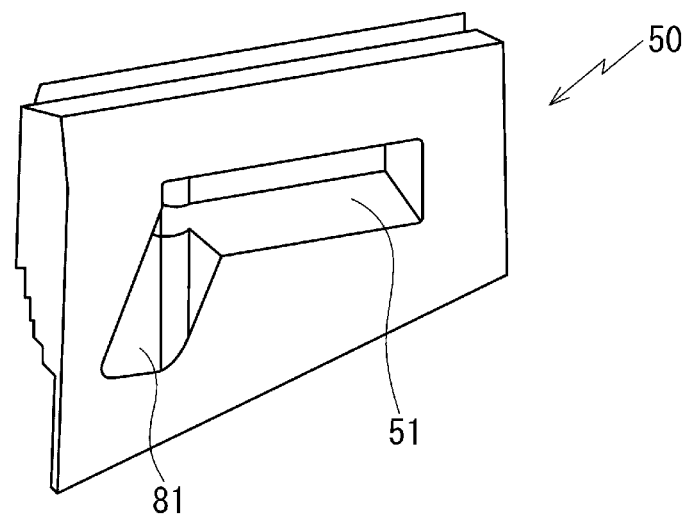

An insert panel 50 is embedded in the die molded part 15. FIGS. 4(a) and 4(b) illustrate the insert panel 50. FIG. 4(a) illustrates an inner-cabin side of the insert panel 50 when embedded in the die molded part 15, and FIG. 4(b) illustrates an outer-cabin side of the insert panel 50 when embedded in the die molded part 15.

A concave shaped part 51 is formed at a center of the insert panel 50. The concave shaped part 51 has a shape of an elongated hole. The concave shaped part 51 includes a through hole. The through hole penetrates the insert panel 50 in an inner-cabin and outer-cabin direction.

As illustrated in FIG. 2, the insert panel 50 is embedded in the die molded part 15 with the concave shaped part (through hole) 51 of the insert panel 50 exposed toward the exterior of the automobile. The insert panel 50 is arranged on the die (not illustrated) when connecting the upper part of the second extrusion molded part 12 and the upper part of the parting seal 13 with the end of the first extrusion molded part 11 by die molding. As a result, as illustrated in FIG. 1 and FIG. 2, the insert panel 50 is embedded in the die molded part 15 by die molding.

A drainage channel 81 is formed on a first end of the concave shaped part (through hole) 51 of the insert panel 50. The first end of the concave shaped part (through hole) 51 is closer to a parting portion S, that is a front part of the rear door 300, than a second end opposite the first end. The drainage channel 81 gradually inclines downward toward the exterior of the automobile from the interior of the automobile.

As illustrated in FIG. 2, a drainage bead 82 is formed on the die molded part 15 below the drainage channel 81. The drainage bead 82 has a shape of a gutter, makes elastic contact with an inner surface of the outer garnish 60, and gradually inclines downward toward the parting portion S from the pillar.

Figure 7:
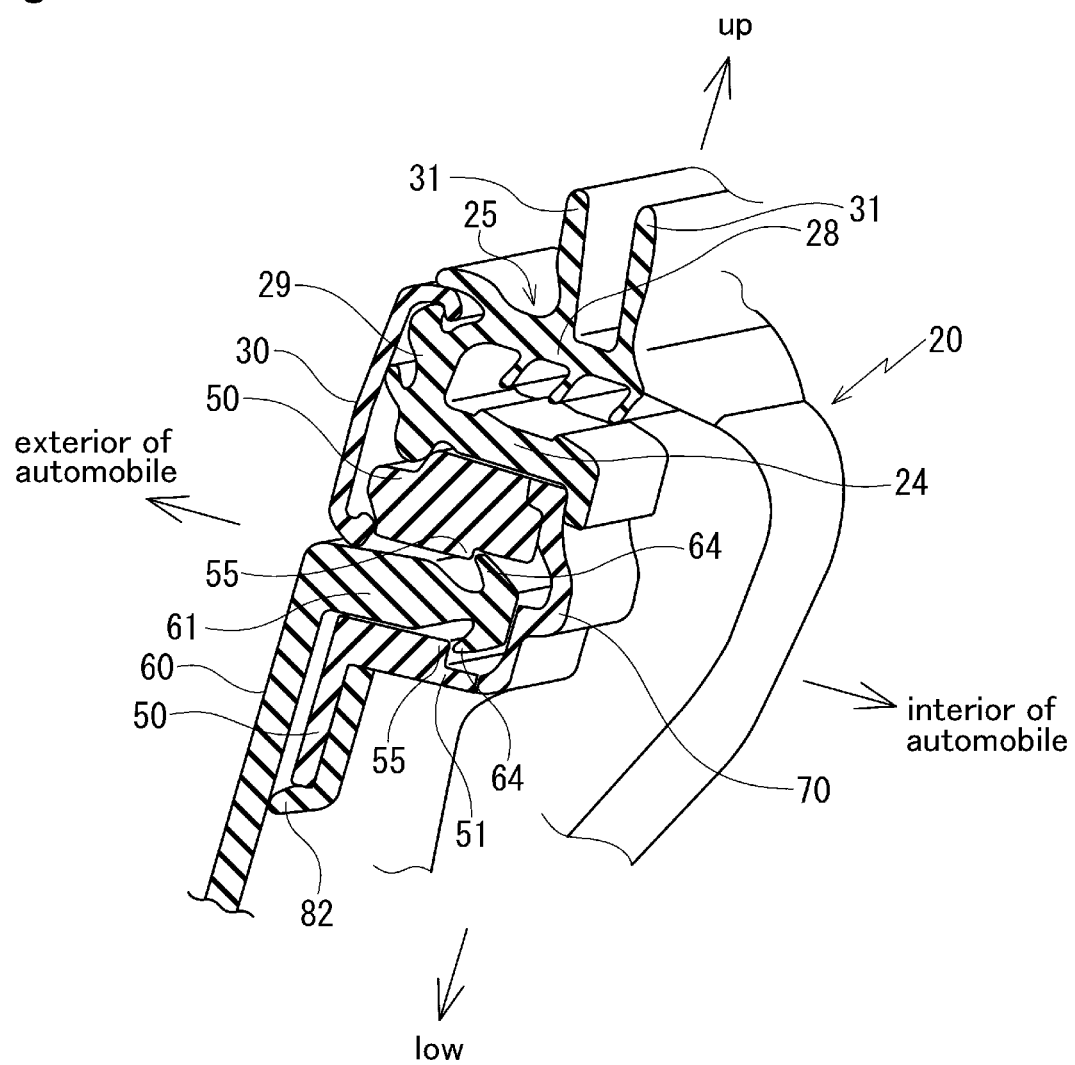
FIG. 7 is an enlarged perspective view of the corner part structure taken line VII-VII of FIG. 1.

As illustrated in FIG. 7, first anchoring parts 55, 55 are formed on an upper surface and a lower surface of an outer-cabin side end of the concave shaped part (through hole) 51 of the insert panel 50. The first anchoring part 55 on the upper surface protrudes downward and the first anchoring part 55 on the lower surface protrudes upward.

The arrowhead-shaped parts 64, 64 as the second anchoring parts formed on the convex shaped part 61 fit with the first anchoring parts 55, 55 such that the outer garnish 60 engages with the insert panel 50. The convex shaped part 61 is formed on the upper part of the outer garnish 60, and extends toward the interior of the automobile.

Figure 3:
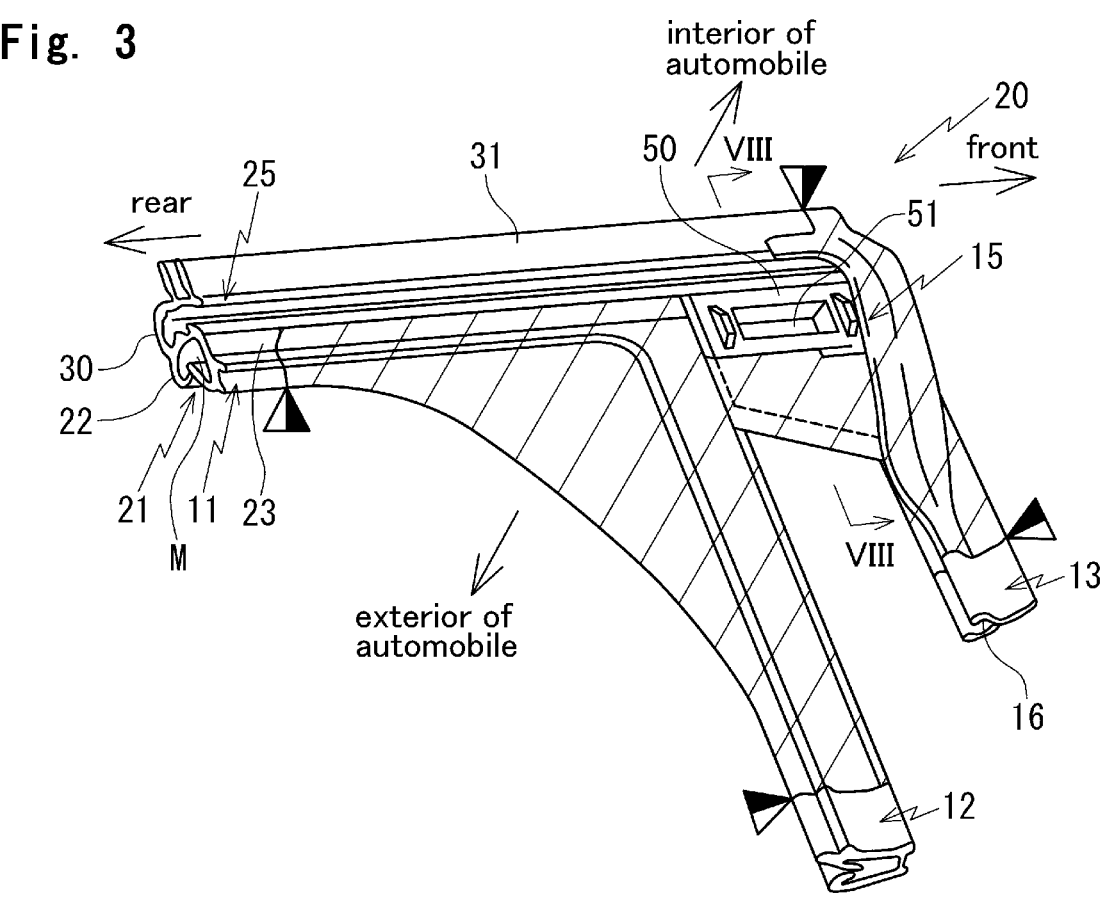
FIG. 3 is the perspective view of the inner-cabin side of the corner part structure of the glass run of FIG. 1 with a lid detached.

In the present embodiment, as illustrated in FIG. 1 and FIG. 3, a channel 16 is formed on a rear part of the parting seal 13, that is a part of the parting seal 13 closer to the second extrusion molded part 12. A side end of the outer garnish 60 is fit into the channel 16.

Figure 5:
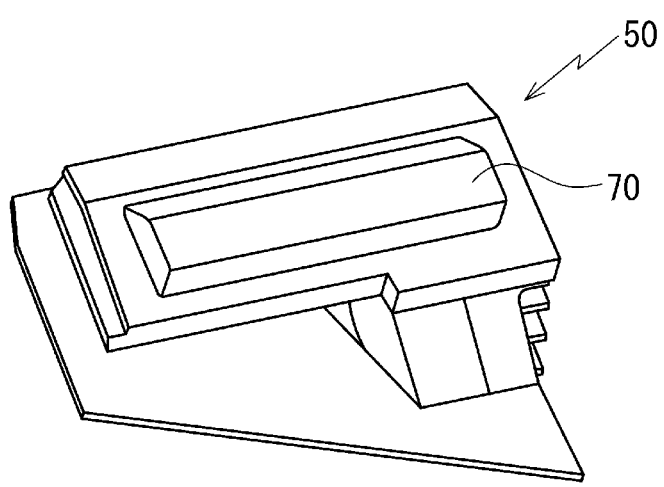
FIG. 5 is the perspective view of the inner-cabin side of the insert panel of FIG. 4(*a*) with a lid attached.

As illustrated in FIG. 5 and FIG. 7, a lid 70 closes an inner-cabin side of the concave shaped part (through hole 51) of the insert panel 50.

While in this embodiment the lid 70 is separate from the insert panel 50 and the lid 70 is fit on an inner-cabin side of the insert panel 50, this should not be construed in a limiting sense. Another possible embodiment is that the lid 70 is integral with the insert panel 50 by a hinge, the lid 70 rotates to approach the insert panel 50 with the hinge as starting point, and the lid couples to the inner-cabin side of the insert panel 50.

In the present embodiment, the die molded part 15 connects the upper part of the second extrusion molded part 12 and the upper part of the parting seal 13 with the end of the first extrusion molded part 11, and the outer garnish 60 couples to the die molded part 15 from the exterior of the automobile. The first extrusion molded part 11, the second extrusion molded part 12, and the parting seal 13 are formed by extrusion molding. The insert panel 50 is embedded in the die molded part 15 with the concave shaped part (through hole) 51 of the insert panel 50 exposed toward the exterior of the automobile. The first anchoring part 55 is formed on the concave shaped part (through hole) 51 of the insert panel 50. The second anchoring part 64, 65 is formed on the convex shaped part 61 of the outer garnish 60. The outer garnish 60 couples to the die molded part 15 from the exterior of the automobile with the second anchoring part 64, 65 engaging with the first anchoring part 55. This configuration eliminates the need for forming a cutout (notch) on the first part 400. Accordingly, water does not infiltrate the interior of the automobile.

Figure 15:
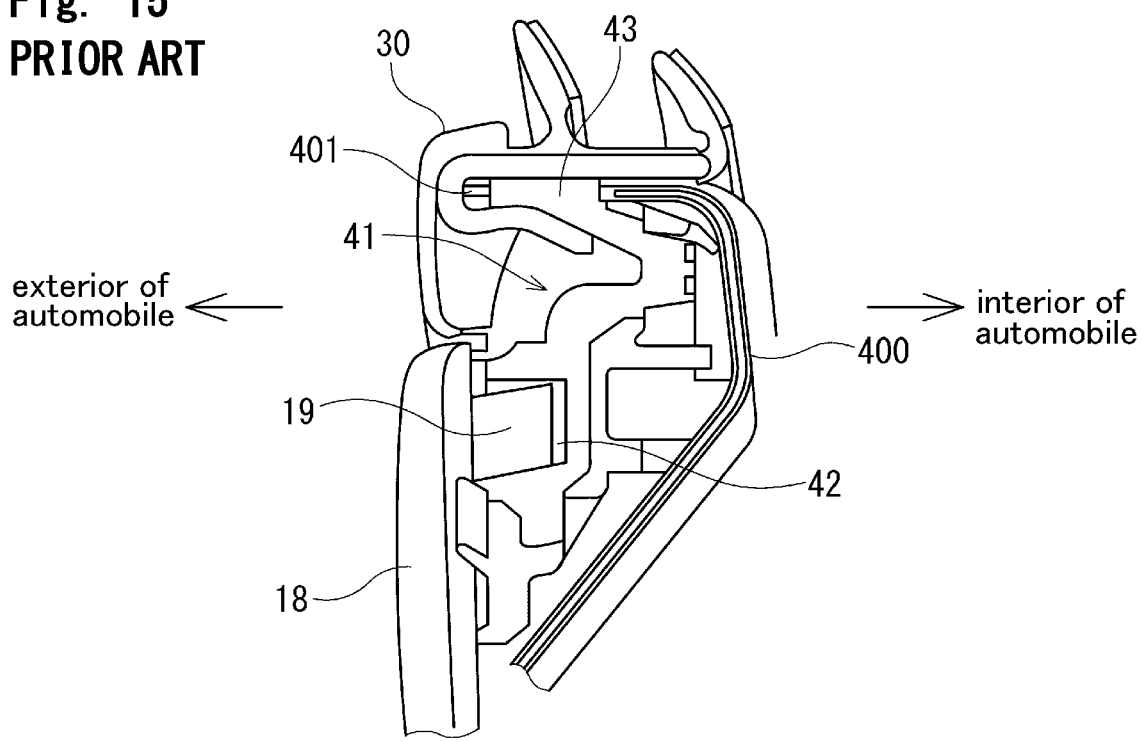
FIG. 15 is an enlarged longitudinal-sectional view of the corner part structure taken along line XV-XV of FIG. 12.
Figure 16:
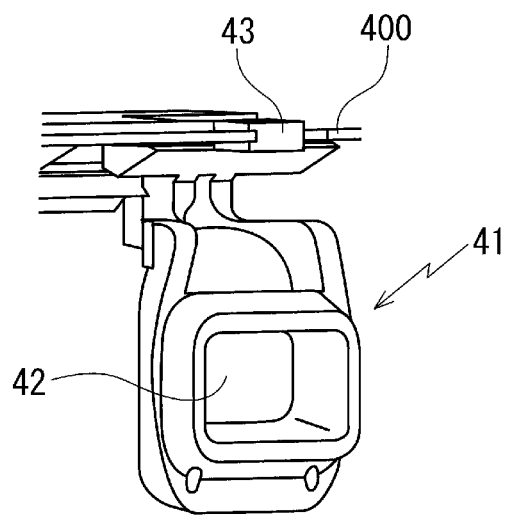
FIG. 16 is an enlarged perspective view of a holder illustrated in FIG. 15.

Since the first anchoring part 55 and the second anchoring part 64, 65 are tightly engaged with each other, the outer garnish 60 couples to the die molded part 15 more stably than an ordinary outer garnish which slightly engages with the concave shaped part 42 as illustrated in FIG. 15 and FIG. 16.

With this configuration, appearance of the corner part is not degraded because the outer garnish 60 does not rise or shift.

In addition, the concave shaped part 51 of the insert panel 50 includes the through hole. The through hole penetrates the insert panel 50 in the inner-cabin and outer-cabin direction. With this configuration, a core for die molding is simply pulled out at the time of die molding.

Figure 8:
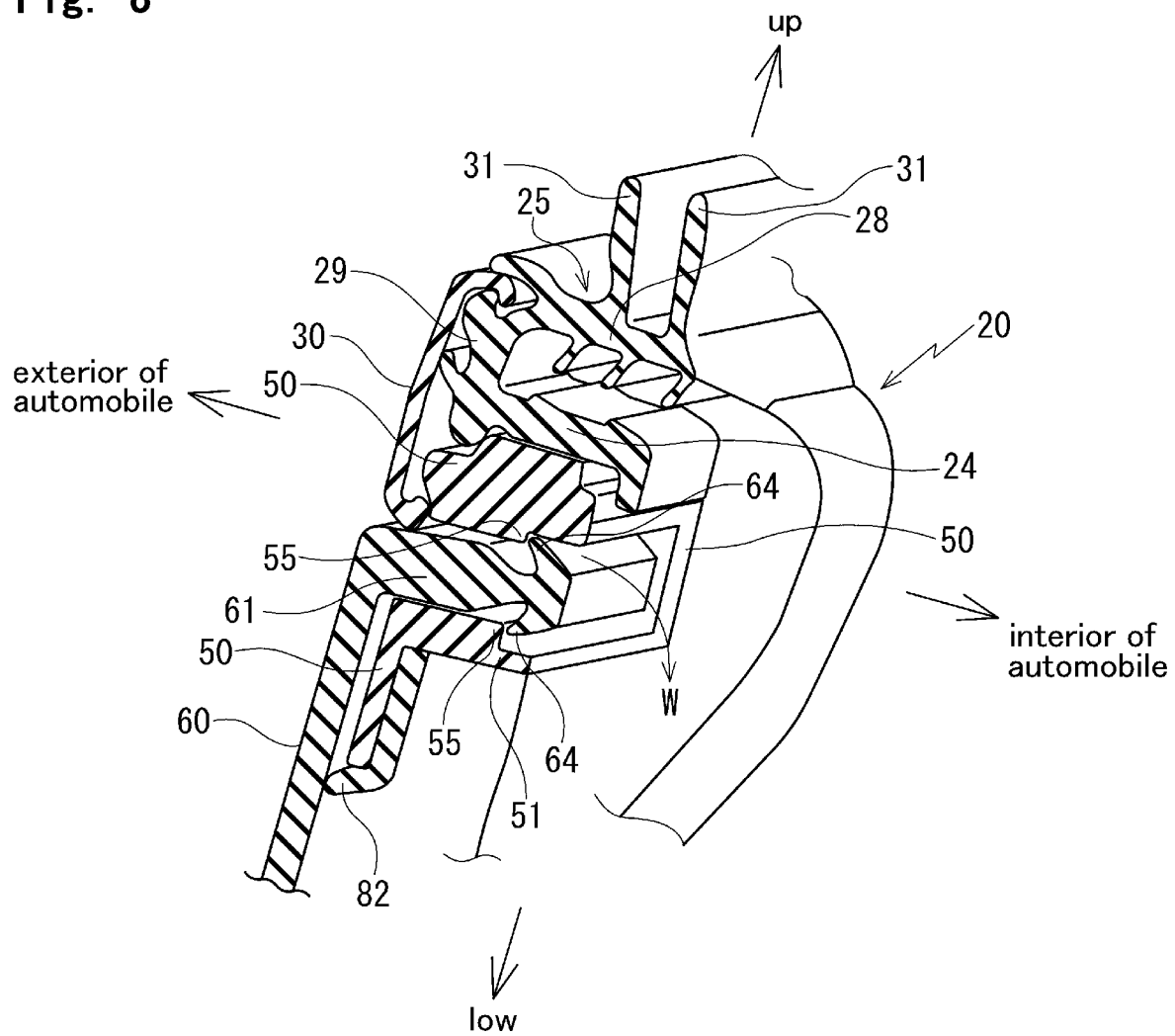
FIG. 8 is an enlarged perspective view of the corner part structure taken line VIII-VIII of FIG. 3.

The through hole may cause infiltration of water W as illustrated in FIG. 8 toward the interior of the automobile from the exterior. But the lid 70 closes the inner-cabin side of the through hole and prevents infiltration of water W toward the interior of the automobile.

In the present embodiment, the drainage channel 81 is formed on the outer-cabin side surface of the first end of the concave shaped part (through hole) 51 of the insert panel 50, the first end is closer to the parting portion S than the second end opposite the first end, and the drainage channel 81 gradually inclines downward toward the exterior of the automobile from the interior of the automobile. With this configuration, the drainage channel 81 drains water for car washing or rain water which infiltrates the concave shaped part (through hole) 51 of the insert panel 50 due to a camber of the automobile or a slope on a road surface of a parking space. As a result, water does not remain stagnant in the concave shaped part 51.

In addition, the drainage bead 82 is formed on the die molded part 15 below the drainage channel 81, the drainage bead 82 makes elastic contact with the inner-cabin side surface of the outer garnish 60, and the drainage bead 82 gradually inclines downward toward the parting portion S from the second part 500. With this configuration, the drainage bead 82 guides water W, drained by the drainage channel 81, toward the parting portion S, and water W does not infiltrate the interior of the automobile.

While in this embodiment the lid 70 closes the inner-cabin side of the concave shaped part (through hole) 51, the lid 70 should not be construed in a limiting sense. Another possible embodiment is that any preventive treatment against infiltration of water W, not the lid 70, prevents infiltration of water W toward the interior of the automobile without fitting the lid 70 on the inner-cabin side of the through hole (see FIG. 3).

Figure 9:
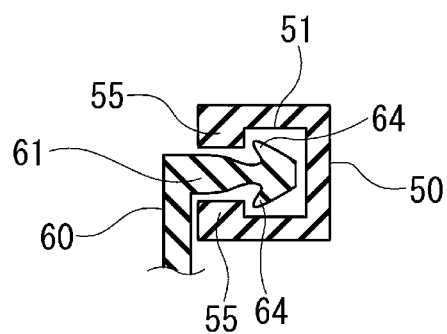
FIG. 9 is an enlarged longitudinal-sectional view of the insert panel and the outer garnish of the corner part structure according to the embodiment of the present invention of the glass run with the insert panel and the outer garnish engaging with each other.
Figure 10:
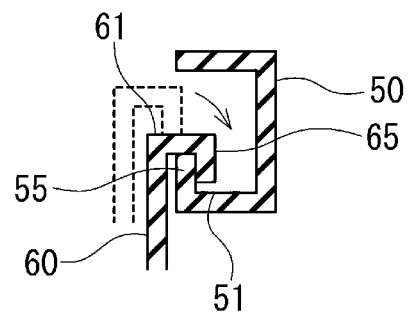
FIG. 10 is an enlarged longitudinal-sectional view of the insert panel and the outer garnish of the corner part structure according to another embodiment of the present invention of the glass run with the insert panel and the outer garnish engaging with each other.

Another possible embodiment is that the concave shaped part 51 of the insert panel 50 does not penetrate the inner-cabin side of the insert panel 50 as illustrated in FIG. 9 and FIG. 10. This embodiment is applicable to a configuration where the core for die molding is not hard to pull out in the process of die molding.

Examples of the embodiment include a configuration with a first wall, a second wall, and the lid (detachable wall) 70 (illustration omitted). The first wall is fixed on the inner-cabin side of the insert panel 50, the second wall is fixed on a first end of the insert panel 50 in a front and rear direction of the automobile, and the lid (detachable wall) 70 is fit on a second end of the insert panel 50 in the front and rear direction and closes the second end.

In this embodiment, it is only required that the outer garnish 60 engages with the insert panel 50. Accordingly, this embodiment includes various modifications.

Another possible embodiment is that an anchoring plate 65 as a second anchoring part is formed on a top end of a flat plate 61 of the outer garnish 60 as illustrated in FIG. 10, the top end of the flat plate 61 is moved in a direction indicated by an arrow in FIG. 10, and the anchoring plate 65 engages with the first anchoring part 55. The anchoring plate 65 extends downward from the top end of the flat plate 61. The first anchoring part 55 protrudes upward from the lower surface of the concave shaped part 51 of the insert panel 50.

Another possible embodiment is that a through hole (illustration omitted) as the second anchoring hole, not the anchoring plate 65 as the second anchoring part as illustrated in FIG. 10, is formed on the flat plate 61 of the outer garnish 60, and the first anchoring part 55 engages with the through hole.

Another possible embodiment is that the singular arrowhead-shaped part 64 as the second anchoring part on the upper part or the lower part of the top end of the convex shaped part 61 of the outer garnish 60 engages with the counterpart singular first anchoring part 55 on the concave shaped part 51 of the insert panel 50. This is a modification of the embodiment illustrated FIG. 9, in which the arrowhead-shaped parts 64, 64 on the upper part and the lower part of the top end of the convex shaped part 61 engage with the first anchoring parts 55, 55 on the concave shaped part 51.

In case the singular arrowhead-shaped part 64 engages with the counterpart singular first anchoring part 55, size of parts of the arrowhead-shaped part 64 and the first anchoring part 55 in contact with each other is not limited. The outer garnish 60 may be fit into and engaged with the insert panel 50 by moving the outer garnish 60 straight toward the interior of the automobile from the exterior or by moving the outer garnish 60 by rotation.

In this embodiment, it is only required that the first extrusion molded part 11 and the second extrusion molded part 12 of the glass run include elastic material. Usable elastic material is not limited.

Examples of the usable elastic material include thermoplastic elastomer such as olefinic thermoplastic elastomer (TPO), styrene-based thermoplastic elastomer (TPS), and rubber materials such as ethylene propylene rubber (EPDM).

The elastic material preferably includes non-foamed material for the elastic material is required to have rigidity, but may also include microporous material.

The core 32 buried in the first extrusion molded part 11 may be made of metal or rigid resin.

The die molded part 15 as the corner part may include the same material as the first extrusion molded part 11 and the second extrusion molded part 12.

In this embodiment, it is only required that the insert panel includes rigid resin. Usable rigid resin is not limited.

Examples of the usable rigid resin include PP (polypropylene) with talc and PA (polyamide) resin with glass fiber.

Figure 11:
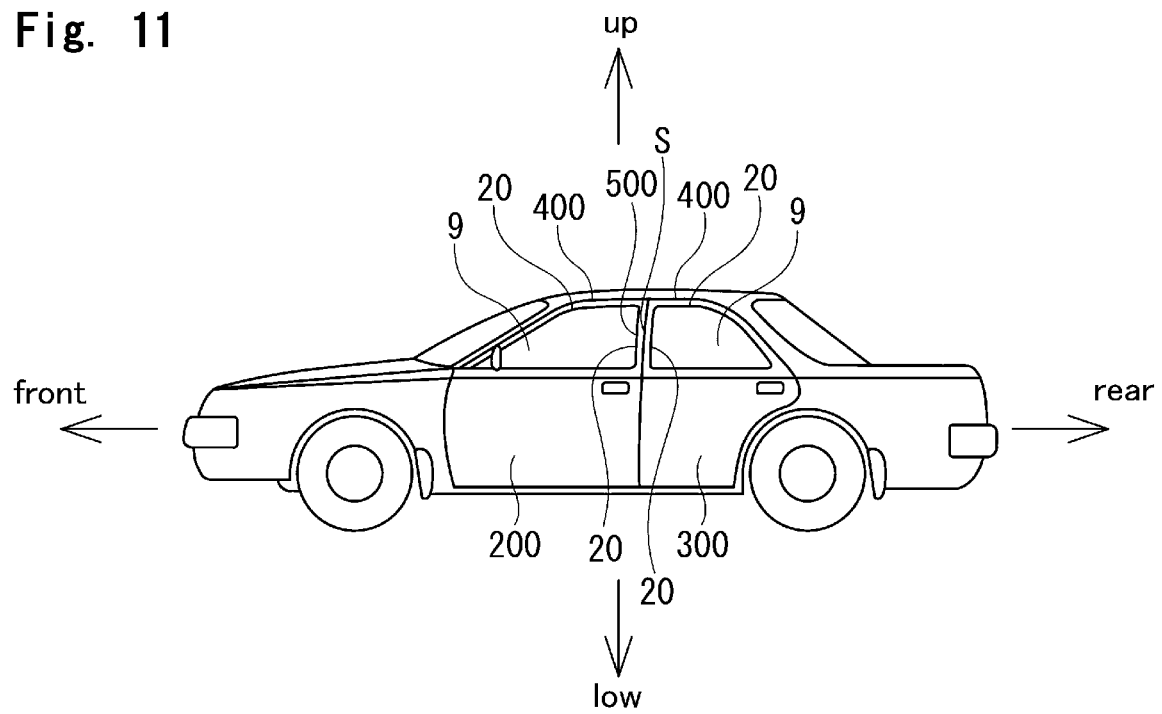
FIG. 11 is a left side view of an automobile.
Figure 12:
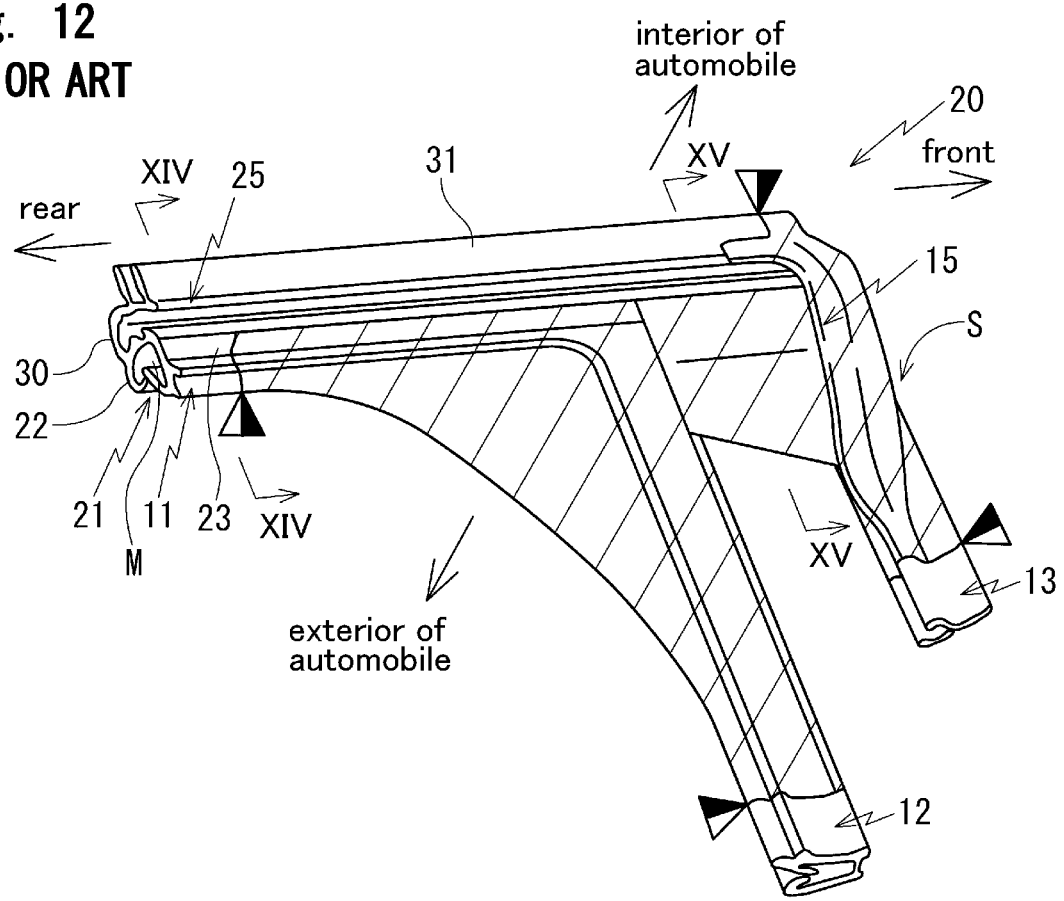
FIG. 12 is a perspective view of a corner part structure according to a prior art of a glass run.

While the present embodiment relates to the corner part structure on the upper part of the rear door 300 closer to the front part of the automobile body as illustrated in FIG. 11, this should not be construed in a limiting sense. Another possible embodiment relates to a corner part structure on an upper part of the front door 200 closer to the rear part of the automobile body. The glass run 20 couples to the front door 200, includes the second extrusion molded part 12 and the parting seal 13, and the outer garnish 60 couples to the space between the extrusion molded part 12 and the parting seal 13 from the exterior of the automobile.

Another possible embodiment relates to a corner part structure on the upper part of the front door 200 closer to the rear part of the automobile body. The glass run 20 couples to the front door 200, includes the second extrusion molded part 12 and does not include the parting seal 13, and the outer garnish 60 couples to the die molded part adjacent the second extrusion molded part 12 from the exterior of the automobile.

I claim:

1. A corner part structure of a glass run for at least one of a rear door and a front door of an automobile, for guiding a door glass in a frame, the frame including a first part closer to a roof of an automobile body and a second part closer to a pillar of the automobile body, and the corner part structure comprising:

a body which includes an outer-cabin side wall, an inner-cabin side wall, and a glass run side wall which connects the outer-cabin side wall and the inner-cabin side wall and forms a channel;

a first extrusion molded part which extends horizontally along the first part of the frame closer to the roof of the automobile body, and which is formed by extrusion molding;

a second extrusion molded part which extends in an upper and lower direction of the automobile body along the second part of the frame closer to the pillar of the automobile body, and which is formed by extrusion molding;

a die molded part which connects an upper part of the second extrusion molded part with an end of the first extrusion molded part;

an insert panel embedded in the die molded part with a concave shaped part of the insert panel exposed toward an exterior of the automobile, the concave shaped part including a through hole, and the through hole penetrating the insert panel in an inner-cabin and outer-cabin direction;

an outer garnish which couples to the die molded part from the exterior of the automobile by fitting a convex shaped part of the outer garnish into the concave shaped part of the insert panel;

a first anchoring part formed on the concave shaped part of the insert panel;

a second anchoring part formed on the convex shaped part of the outer garnish, the second anchoring part being configured to engage with the first anchoring part; and a lid configured to close an inner-cabin side of the through hole.

2. The corner part structure as claimed in claim 1, wherein the lid is separate from the insert panel and the lid is fit on an inner-cabin side of the insert panel.

3. The corner part structure as claimed in claim 1, wherein the lid is integral with the insert panel by a hinge, the lid rotates to approach the insert panel with the hinge as a starting point, and the lid couples to an inner-cabin side of the insert panel.

4. The corner part structure as claimed in claim 1, further comprising a drainage channel formed on an outer-cabin side surface of a first end of the concave shaped part of the insert panel, the first end of the concave shaped part being closer to a parting portion than a second end opposite the first end, the parting portion being between the rear door and the front door, and the drainage channel gradually inclining downward toward the exterior of the automobile from an interior of the automobile.

5. The corner part structure as claimed in claim 4, further comprising a drainage bead formed on the die molded part below the drainage channel, the drainage bead being configured to make elastic contact with an inner-cabin side surface of the outer garnish, and the drainage bead gradually inclining downward toward the parting portion from the second part of the frame closer to the pillar of the automobile body.

* * * * *